United States Patent
Kyoung et al.

(10) Patent No.: US 7,468,825 B2
(45) Date of Patent: Dec. 23, 2008

(54) SPATIAL OPTICAL MODULATOR WITH PASSIVATION LAYER

(75) Inventors: Je-Hong Kyoung, Seongnam-si (KR); Jae-Wook Jang, Seongnam-si (KR); Jong-Hyeong Song, Suwon-si (KR); Yun-Jin Ko, Seoul (KR); Seung-Do An, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 94 days.

(21) Appl. No.: 11/591,226

(22) Filed: Oct. 31, 2006

(65) Prior Publication Data

US 2007/0097488 A1     May 3, 2007

(30) Foreign Application Priority Data

Nov. 1, 2005   (KR) .................. 10-2005-0104018
Dec. 14, 2005  (KR) .................. 10-2005-0123395
Oct. 2, 2006   (KR) .................. 10-2006-0097428
Oct. 2, 2006   (KR) .................. 10-2006-0097435

(51) Int. Cl.
    *G02B 26/08*    (2006.01)
(52) U.S. Cl. .................. 359/224; 359/291; 359/847
(58) Field of Classification Search .......... 359/223, 359/224, 290, 291, 318, 847, 849, 872, 883
See application file for complete search history.

(56) References Cited

U.S. PATENT DOCUMENTS 6,375,329 B1 * 4/2002 Yokoyama et al. ............ 353/31
2005/0063038 A1 * 3/2005 Filhol .......................... 359/291

* cited by examiner

*Primary Examiner*—Joseph Martinez
(74) *Attorney, Agent, or Firm*—Christensen O'Connor Johnson Kindness PLLC

(57) ABSTRACT

Disclosed is an optical modulator including: a substrate; an insulation layer disposed on the substrate; a ribbon layer, a center portion of which is spaced apart from the insulation layer by a predetermined gap; a piezoelectric element that is disposed on the ribbon layer and allows the center portion of the ribbon layer to bend vertically; and a passivation layer that is disposed on the piezoelectric element and comprises a main passivation film.

11 Claims, 7 Drawing Sheets

SPATIAL OPTICAL MODULATOR WITH PASSIVATION LAYER

CROSS-REFERENCE TO RELATED APPLICATIONS

This application claims the benefit of Korean Patent Application No. 2005-0104018 filed with the Korean Intellectual Property Office on Nov. 1, 2005, of Korean Patent Application No. 2005-0123395 filed on Dec. 14, 2005, of Korean Patent Application No. 2006-0097428 filed on Oct. 2, 2006, and of Korean Patent Application No. 2006-0097435 filed on Oct. 2, 2006, the disclosures of which are incorporated herein by reference in their entirety.

BACKGROUND

1. Technical Field

The present invention relates to a MEMS element and a manufacturing method therefor, in particular, to an optical modulator and a manufacturing method therefor.

2. Description of the Related Art

A MEMS refers to a micro electro mechanical system, and is fabricated by a MEMS technology that forms a three dimensional structure on a silicon substrate by means of a semiconductor manufacturing process. Such a MEMS has been applied in diverse fields including optics. Through the MEMS technology can be produced optical components smaller than 1 mm, by which micro optical systems are realized. These optical components including optical modulators, micro-lenses, and the like have been widely applied in telecommunication devices, displays, and recording devices due to such advantages as quick response time, low level of loss, and convenience in layering and digitalizing.

The optical modulator is a device in which a signal-controlled element is used to modulate a beam of light. The optical modulator can be divided mainly into a direct type directly controlling the on/off state of light, and an indirect type exploiting optical reflection and diffraction. The indirect type can be further divided into an electrostatic type and a piezoelectric type according to its operation style.

Regardless of its operation style, the indirect type optical modulator performs optical modulations by means of optical interference occurring due to the pathlength difference between diffracted lights. Especially, the piezoelectric type optical modulator generates the pathlength difference by using driving power of piezoelectric elements, which contract and expand according to the voltage applied thereto (for further understanding, refer to the description regarding FIGS. 3 and 4). Therefore, the piezoelectric elements play an important role in the piezoelectric type optical modulator.

However, during the manufacturing process for the optical modulator, moisture permeates into the optical modulator, thereby changing the operational characteristics of the piezoelectric elements. Such changes in the piezoelectric elements cause the gap between ribbons and an insulation layer in the optical modulator to fluctuate, thereby deteriorating the optical diffraction properties and the reliability of the optical modulator.

SUMMARY

One aspect of the present invention provides an optical modulator including: a substrate; an insulation layer disposed on the substrate; a ribbon layer, a center portion of which is spaced apart from the insulation layer by a predetermined gap; a piezoelectric element that is disposed on the ribbon layer and allows the center portion of the ribbon layer to bend vertically; and a passivation layer that is disposed on the piezoelectric element and includes a main passivation film.

Here, the optical modulator further includes a sacrificial layer that is disposed between the insulation layer and the ribbon layer and supports the ribbon layer, wherein a portion of the sacrificial layer below the center portion of the ribbon layer is etched to provide a predetermined gap between the ribbon layer and the insulation layer.

Also, the piezoelectric element includes: a lower electrode; a piezoelectric layer disposed on the lower electrode; and an upper electrode disposed on the piezoelectric layer, wherein the piezoelectric layer contracts and expands according to a predetermined voltage applied between the lower electrode and the upper electrode to provide driving power to the center portion of the ribbon layer.

Here, the main passivation layer is formed of dielectric material.

Here, the dielectric material includes $Al_2O_3$, $TiO_2$, $Ta_2O_5$, $SiO_2$, SiN and SiBN.

Here, the thickness of the main passivation film ranges from $10^{-3}$ μm up to 1 μm.

Furthermore, the passivation layer further includes a sub passivation film disposed on the main passivation film.

Here, the sub passivation film is formed of dielectric material.

Here, the dielectric material includes $Al_2O_3$, $TiO_2$, $Ta_2O_5$, $SiO_2$, SiN and SiBN.

Here, the thickness of the sub passivation film ranges from $10^{-3}$ μm up to 1 μm.

Also, the passivation layer further includes another sub passivation film that is disposed between the piezoelectric element and the main passivation film.

Here, the another sub passivation film is formed of $Al_2O_3$.

Additional aspects and advantages of the present general inventive concept will be set forth in part in the description which follows, and in part will be obvious from the description, or may be learned by practice of the general inventive concept.

BRIEF DESCRIPTION OF THE DRAWINGS

These and other features, aspects, and advantages of the present invention will become better understood with regard to the following description, appended claims, and accompanying drawings where:

FIG. 6(*b*) is a structural sectional view of a passivation layer composed of double films;

FIG. 6(*c*) is a structural sectional view of a passivation layer composed of triple films.

DETAILED DESCRIPTION

Hereinafter, embodiments of the invention will be described in more detail with reference to the accompanying drawings. In the description with reference to the accompanying drawings, those components are rendered the same reference number that are the same or are in correspondence regardless of the figure number, and redundant explanations are omitted.

A piezoelectric type optical modulator applicable to the present invention will first be described before discussing embodiments of the present invention.

Figure 1:
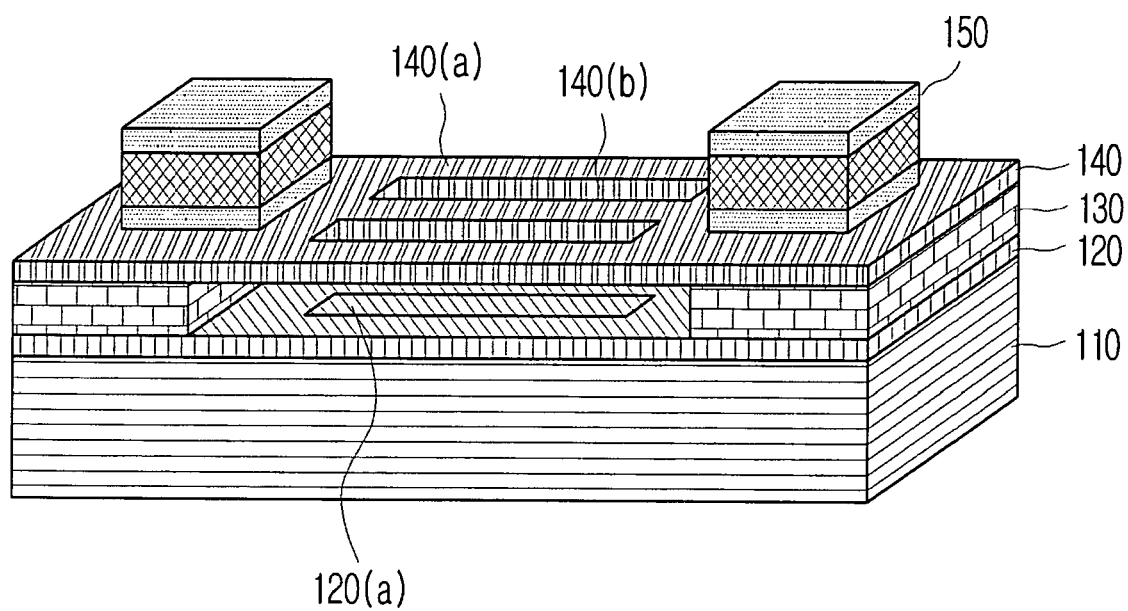
FIG. 1 is a perspective view of a piezoelectric type optical modulator applicable to an embodiment of the present invention.
Figure 2:
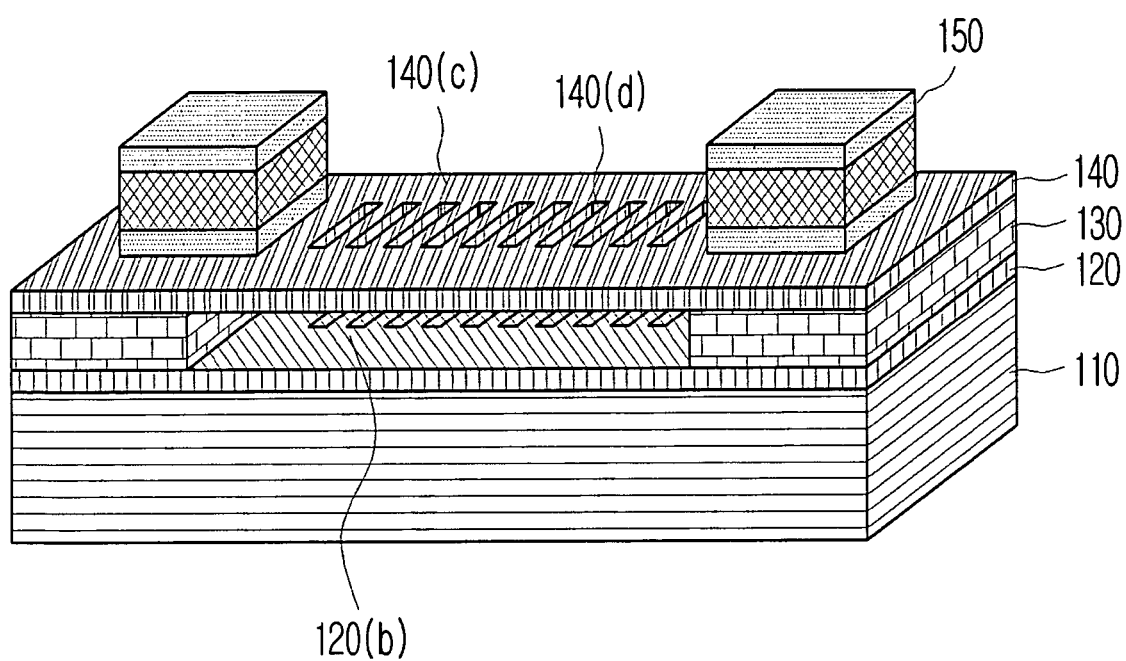
FIG. 2 is a perspective view of another piezoelectric type optical modulator applicable to an embodiment of the present invention.

FIG. 1 is a perspective view of a piezoelectric type optical modulator applicable to an embodiment of the present invention, and FIG. 2 is a perspective view of another piezoelectric type optical modulator applicable to an embodiment of the present invention;

As shown in FIGS. 1 and 2, the piezoelectric type optical modulator includes a substrate 110, an insulation layer 120, a sacrificial layer 130, ribbon layer 140, and piezoelectric elements 150. The ribbon layer 140 has a plurality of holes 140(b), 140(d) in its center portion. In addition, an upper reflective layer 140(a), 140(c) may be formed on the rest of the center portion of the ribbon layer 140 that is not occupied by the holes, and a lower reflective layer 120(a), 120(b) may be formed on the insulation layer 120 in correspondence with the plurality of holes. The piezoelectric elements 150 control the ribbon layer 140 to bend vertically, according to the degree of up/down or left/right contraction and expansion generated by the voltage difference between upper and lower electrodes. Each part of the optical modulator will be described later in the description of FIG. 5.

Figure 3:
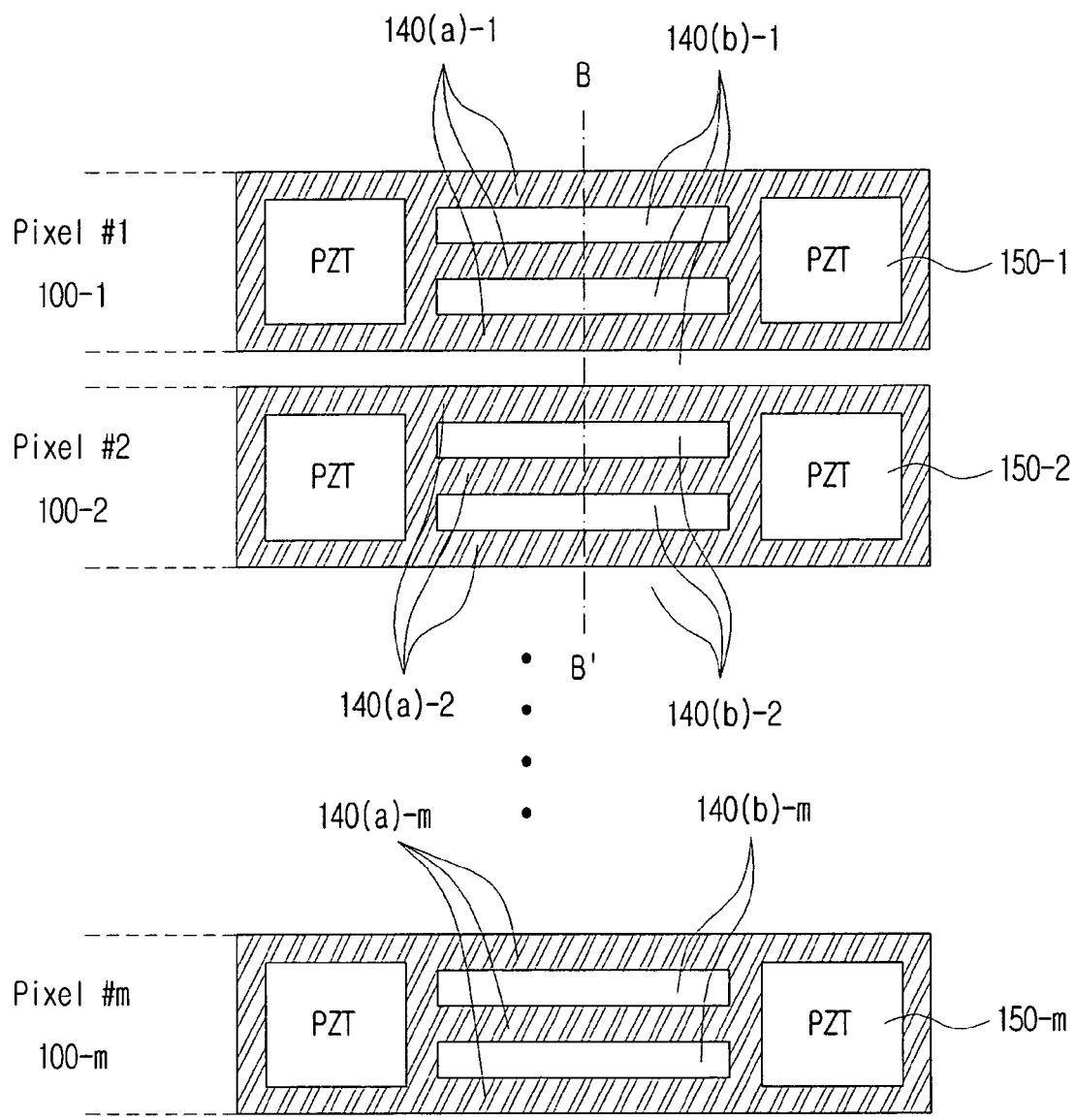
FIG. 3 is a plan view of an optical modulator array composed of the optical modulators illustrated in FIG. 1.
Figure 4:
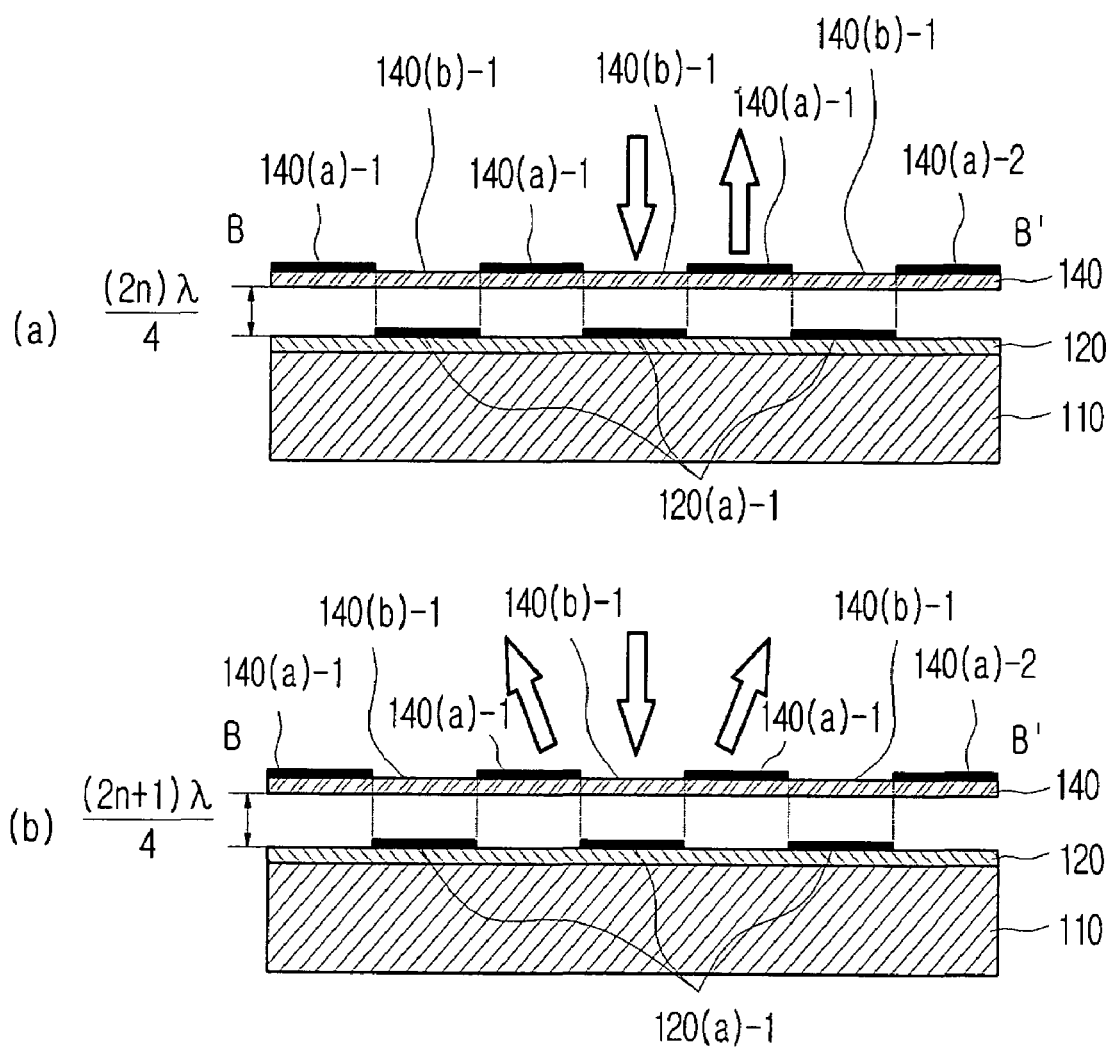
FIGS. 4(*a*) and 4(*b*) are to explain an optical modulation principle of the optical modulator array illustrated in FIG. 3.

FIGS. 3 and 4 illustrate how incident lights are modulated in the optical modulator.

FIG. 3 is a plan view of an optical modulator array composed of the optical modulators illustrated in FIG. 1, and FIG. 4 is a cross-sectional view of the optical modulator illustrated in FIG. 3 along the line BB' in order to explain an optical modulation principle of the optical modulator array illustrated in FIG. 3.

Referring to FIG. 3, the optical modulator array is composed of an m number of micro mirrors 100-1, 100-2, . . . , 100-m, each responsible for pixel #1, pixel #2, . . . , pixel #m. The optical modulator array deals with image information on one dimensional image of vertical or horizontal scanning lines (Here, it is assumed that one vertical or horizontal scanning line consists of an m number of pixels), wherein each optical modulator 100-1, 100-2, . . . , 100-m deals with one of the m pixels constituting the vertical or horizontal scanning line. Thus, the light reflected and diffracted by each optical modulator is later projected by an optical scanning device as a two-dimensional image on a screen. For example, in the case of VGA 640*480 resolution, modulation is performed 640 times on one surface of an optical scanning device (not shown) for 480 vertical pixels, to generate 1 frame of display per surface of the optical scanning device. Here, the optical scanning device may be a polygon mirror, a rotating bar, or a galvano mirror, etc.

While the following description focus on pixel #1 to explain an optical modulation principle, the same can surely apply to other pixels.

In the present embodiment, it is assumed that the number of holes 140(b)-1 formed in the ribbon layer 140 is two. Because of the two holes 140(b)-1, there are three upper reflective layers 140(a)-1 formed on the upper portion of the ribbon layer 140. On the insulation layer 120, two lower reflective layers are formed in correspondence with the two holes 140(b)-1. Also, there is another lower reflective layer formed on the insulation layer 120 in correspondence with the gap between pixel #1 and pixel #2. Thus, there are an equal number of upper reflective layers 140(a)-1 and lower reflective layers per pixel, and it is possible to control the luminosity of the modulated light using 0th-order diffracted light or ±1st-order diffracted light.

As shown in FIG. 4(a), a first voltage is applied to the piezoelectric elements 150 such that the gap between the ribbon layer 140, on which the upper reflective layer 140(a) is formed, and the insulation layer 120, on which the lower reflective layer 120(a) is formed, is equal to $(2n)\lambda/4$ (wherein n is a natural number, and $\lambda$ is the wavelength of light). Thus, in the case of 0th-order diffracted (reflected) light, the overall pathlength difference between the light reflected by the upper reflective layer 140(a) and the light reflected by the lower reflective layer 120(a) becomes $n\lambda$, so that a constructive interference occurs to generate maximum brightness. On the other hand, in the case of +1st or −1st order diffracted light, the light has minimum brightness due to a destructive interference.

As shown in FIG. 4(b), a second voltage is applied to the piezoelectric elements 150, such that the gap between ribbon the layer 140, on which the upper reflective layer 140(a) is formed, and the insulation layer 120, on which the lower reflective layer 120(a) is formed, is equal to $(2n+1)\lambda/4$ (wherein n is a natural number, and $\lambda$ is the wavelength of light). Thus, in the case of 0th-order diffracted (reflected) light, the overall pathlength difference between the light reflected by the upper reflective layer 140(a) and the light reflected by the lower reflective layer 120(a) becomes $(2n+1)\lambda/2$, so that the destructive interference occurs to generate minimum brightness. On the other hand, in the case of +1st or −1st order diffracted light, the light has maximum brightness due to the constructive interference. As a result of such interference, the optical modulator can load signals on the beams of light by controlling the quantity of the reflected or diffracted light.

Although the foregoing describes the cases in which the gap between the ribbon layer 140, on which the upper reflective layer 140(a) is formed, and the insulation layer 120, on which the lower reflective layer 120(a) is formed, is $(2n)\lambda/4$ or $(2n+1)\lambda/4$, it is obvious that a variety of embodiments, which operate with a gap controlling the intensity of interference by diffraction and reflection, can be applied to the present invention.

Figure 5:
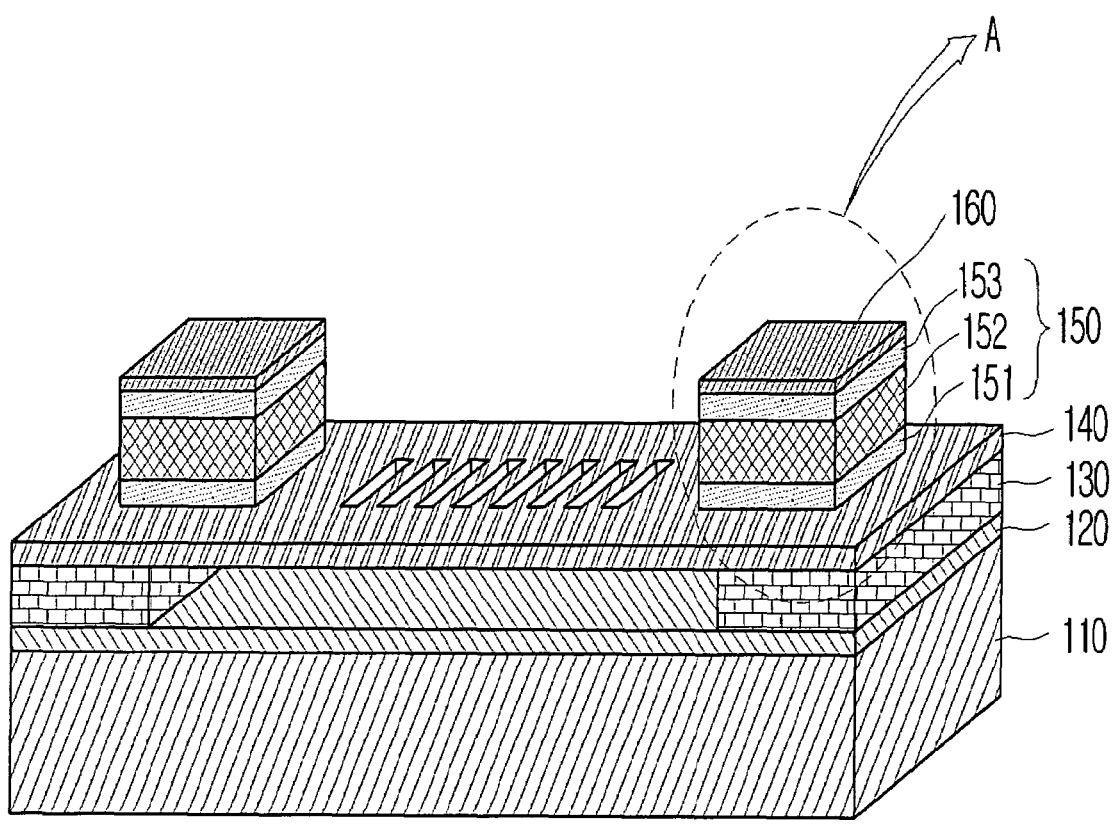
FIG. 5 is a perspective view of an optical modulator having a passivation layer according to an embodiment of the present invention.

FIG. 5 is a perspective view of an optical modulator having a passivation layer according to an embodiment of the present invention. The optical modulator in the description below has holes in the center portion of the ribbon layer 140, but it should be understood that this does not limit the scope of the present invention. Here, a ribbon collectively refers to a part bending vertically due to the driving power of the piezoelectric element 150, and thus, in this embodiment, the center portion of the ribbon layer 140 is called the ribbon.

As shown in FIG. 5, the optical modulator includes the substrate 110, the insulation layer 120, the sacrificial layer 130, the ribbon layer 140, the piezoelectric elements 150, and a passivation layer 160.

The substrate 110 is a commonly used semiconductor substrate, and may be formed of silicon (Si), alumina ($Al_2O_3$), zirconia ($ZrO_2$), quartz, silica ($SiO_2$), or the like.

On the substrate 110 is disposed the insulation layer 120, which functions as an etch stop layer. The insulation layer 120 is formed from a material such as silica (SiO$_2$) that has a high selectivity to the etchant (the etchant is an etchant gas or an etchant solution) that etches the material used as the sacrificial layer.

On the insulation layer 120 may be formed the lower reflective layer 120(a), 120(b) reflecting or diffracting incoming lights. This lower reflective layer may be formed of a material having optical reflection properties such as metallic material (Al, Pt, Cr, Ag, and the like)

The sacrificial layer 130 is disposed on the insulation layer 120, and may be formed of silicon (Si), poly silicon (Poly-Si), or the like.

After being deposited on the insulation layer 120, the sacrificial layer 130 may be etched partially or entirely (partially, in this embodiment) through an etching process that will be described later (refer to FIG. 7(f)). Such an etching process allows the ribbon layer 140 to be spaced apart from the insulation layer 120 by a predetermined gap, thereby generating a driving space therebetween. Therefore, the ribbon of the ribbon layer 140 bends in correspondence with the driving power of the piezoelectric element 150. The rest of the sacrificial layer 140 that is not removed by the etching process supports the ribbon layer 140.

However, when the sacrificial layer 130 is etched entirely (see FIG. 7(f)), it only provides the driving space, thereby incapable of supporting the ribbon layer 140. Therefore, the location of the driving space changes depending on the etching process of the sacrificial layer 130, and the location of the ribbon in the ribbon layer 140 also changes in correspondence with the location of the driving space.

The ribbon layer 140 is disposed on the sacrificial layer 130, and may be formed of silicon nitride based material such as Si$_3$N$_4$.

On the center portion of the ribbon layer 140, namely, on the ribbon may be disposed the upper reflective layer 140(a), 140(c) formed of a material having optical reflection properties, such as Al, Pt, Cr, Ag, etc.

The ribbon layer 140 can be selectively etched to be a particular shape (in this embodiment, the ribbon layer 140 has holes in the center portion). Accordingly, the upper reflective layer is disposed on the area of the center portion of the ribbon layer 140 where the holes are not formed.

The piezoelectric elements 150 are disposed on the ribbon layer 140, and generate driving power allowing the ribbon to bend.

The piezoelectric element 150 includes a lower electrode 151, a piezoelectric layer 152 formed on the lower electrode 150, and an upper electrode 153 formed on the piezoelectric layer 152. When a predetermined voltage is applied between the lower electrode 151 and the upper electrode 153, the piezoelectric layer 152 contracts and expands to generate driving power causing the ribbon to bend.

The upper and lower electrodes 151 and 153 can be made of platinum (Pt), nickel (Ni), aurum (Au), aluminum (Al), titanium (Ti), RuO$_2$, IrO$_2$, or combinations thereof. Furthermore, the upper and lower electrodes 151 and 153 may be formed by sputtering, evaporating, etc. within the thickness range of 0.01-3 μm.

The piezoelectric layer 152 may be formed by a wet process (screen printing, sol-gel coating, etc.) or by a dry process (sputtering, evaporation, MOCVD, vapor disposition, etc.) within the thickness range of 0.01-20.0 μm. Here, the piezoelectric element 152 may be formed of PZT, PNN-PT, PLZT, AlN, ZnO, etc.

On top of the piezoelectric element 150 (namely, on the upper electrode 153) is disposed the passivation layer 160. In order to the piezoelectric element 150 from ambient moisture.

The passivation layer 160 may be composed of a single layer or multiple layers. Hereinafter, the details of passivation layer 160 will be set forth with reference to FIGS. 6(a) through 6(c).

Figure 6:
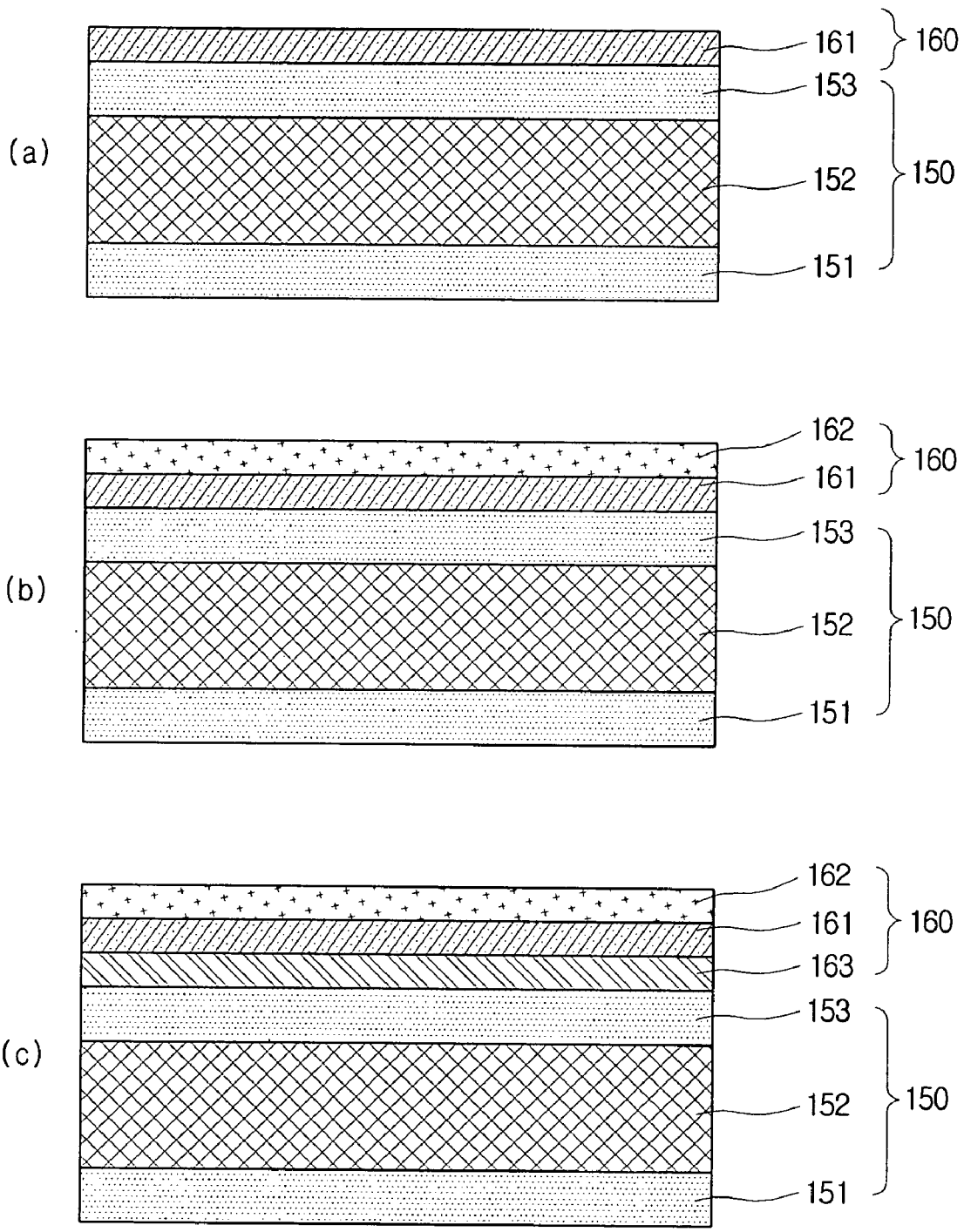
FIG. 6(*a*) is a structural sectional view of a passivation layer composed of a single layer according to an embodiment of the present invention.

FIGS. 6(a) through 6(c) are structural sectional views enlarging part A of FIG. 5. FIGS. 6(a) through 6(c) illustrate cases where the passivation layer 160 has a single layer, two layers, and three layers, respectively.

Although, in FIGS. 6(a) through 6(c), the passivation layer 160 is disposed only on the upper electrode 153, it may also be formed on the lower electrode 151 depending on the shape of the piezoelectric element 150. For example, when the piezoelectric layer 152 is formed on a part of the lower electrode 151, the passivation layer 160 may be formed on the area of the lower electrode that is not occupied by the piezoelectric layer 152, as well as on the upper electrode 153. It is obvious that the passivation layer 160 may have more than three films.

As shown in FIG. 6(a), the passivation layer 160 according to an embodiment of the present invention is composed of a single film (hereinafter, it will be referred to as 'first passivation film 161').

Here, the first passivation film 161 may be formed of a dielectric material, such as Al$_2$O$_3$, TiO$_2$, Ta$_2$O$_5$, SiO$_2$, SiN, SiBN, etc. Especially, Al$_2$O$_3$ is excellent in adhering to the electrodes, and also preventing moisture absorption. Therefore, by forming the first passivation film 161 made of such a dielectric material on the piezoelectric element 150, the ambient moisture can be kept from the piezoelectric element 150 when the optical modulator is manufactured or operates.

The first passivation film 161 may be deposited by a physical vapor deposition (PVD) such as sputtering, e-beam evaporation, etc., a chemical vapor deposition (CVD) such as MOCVD (Metal Organic CVD), PECVD (Plasma Enhanced CVD), etc., or ALD (Atomic Layer Deposition).

Here, the sputtering deposition utilizes kinetic energy of a sputtering gas (inert gas like Ar) in a plasma state to allow a deposition material to be deposited on a target substrate. The e-beam evaporation deposition heats the target substrate by using electronic beams, so that melted deposition material is deposited on the target substrate.

The CVD is a chemical process in which the substrate is exposed to one or more volatile precursors, which react and/or decompose on the substrate surface to produce the desired deposit. The MOCVD is a CVD process based on metal-organic precursors, and the PECVD is another CVD process that utilizes a plasma to enhance chemical reaction rates of the precursors.

The ALD is a process in which two complementary precursors are alternatively introduced into the reaction chamber. Typically, one of the precursors will adsorb onto the substrate surface, but cannot completely decompose without the second precursor. The precursor adsorbs until it saturates the surface and further growth cannot occur until the second precursor is introduced. Thus the film thickness is controlled by the number of precursor cycles rather than the deposition time as is the case for conventional CVD processes. Therefore, the ALD allows for extremely precise control of film thickness and uniformity.

By depositing the first passivation film 161 using one of the above processes, the degree of adhesion between the target substrate (namely, the top of the piezoelectric element 150) and the deposition film (namely, the first passivation film 161) can be increased. It prevents interfacial voids from forming between the piezoelectric element 150 and the first passivation film 161.

FIG. 6(b) illustrates a passivation layer 160 with double films (hereinafter, the lower film will be referred to as 'first passivation film 161', and the upper film will be referred to as 'second passivation film 162'). In other words, the passivation layer 160 of FIG. 6(b) further includes the second passivation film 162 formed on the first passivation film 161.

Particularly, when the first passivation film 161 is deposited by the ALD process, there are cases where it is too thin to function as the passivation layer 160. For example, the breakdown voltage, which is a threshold voltage at which the insulating effect of the passivation layer 160 is not expected, can be lowered, or unwanted leakage current can increase.

In such cases, the operational characteristics of the piezoelectric element 150 are deteriorated, causing the gap difference between the ribbon and the insulation layer 120 to fluctuate. This fluctuation in the gap difference decreases the optical diffraction efficiency of the optical modulator.

To overcome the above drawbacks, the passivation layer 160 may further have the second passivation film 162 in order to protect the first passivation film 161. Thus, the second passivation film 162 indirectly protects the piezoelectric element 150, by protecting the first passivation film 161 that directly protects the piezoelectric element 150.

Here, the second passivation film 162 may be formed of various dielectric material e.g. $Al_2O_3$, $TiO_2$, $Ta_2O_5$, $SiO_2$, SiN, SiBN, etc.

Here, it is desirable that the thickness of the first and second passivation films 161 and 162 ranges from $10^{-3}$ µm up to 1 µm. Here, $10^{-3}$ µm is a minimum thickness each passivation film should have in order to protect the piezoelectric element 150, and 1 µm is a maximum thickness determined based on the characteristics of general passivation films and the yield of the thin film manufacturing process.

Also, considering the thickness of the overall passivation layer 160, it is desirable that the second passivation film 162 be deposited by sputtering, e-beam evaporation, MOCVD, PECVD As shown in FIG. 6(c), a passivation layer 160 according to another embodiment of the present invention has triple films (hereinafter, the bottom, top, and middle films are referred to as 'third passivation film 163', 'second passivation film 162', and 'first passivation film 161', respectively). The third passivation film 163 is first formed before the first passivation film of FIG. 6(b) is deposited.

The third passivation film 163 may be formed of the same material as the second passivation film 162. Especially, when the first passivation film 161 is sandwiched between the second and third passivation films 162 and 163 both formed of aluminum oxide (e.g. $Al_2O_3$) film that is highly moisture-resistant, the passivation layer 160 can be robuster.

Considering the total thickness of the passivation layer 160, however, it is desirable that the third passivation film 163 be formed by ALD process that allows for extremely thin films.

As described above, by forming the passivation layer 160 on the piezoelectric element 150, the present invention prevents the original operation characteristics of the piezoelectric element 150 from changing, thereby preventing the occurrence of malfunctioning. Furthermore, the present invention prevents the fluctuations in the gap difference between the ribbon and the insulation layer 120, so that the diffraction properties and the reliability of the optical modulator can be improved.

FIGS. 7(a) through 7(f) illustrate a manufacturing process for an optical modulator having the passivation layer of FIG. 5.

Referring to FIG. 7(a), on a substrate 110 is formed an insulation layer 120 functioning as an etch stop layer.

Referring to FIG. 7(b), a sacrificial layer 130 is formed on the insulation layer 120. The sacrificial layer 130 is etched partially or entirely, so that a ribbon is spaced apart from the insulation layer 120 to provide a driving space for the ribbon.

Referring to FIG. 7(c), a ribbon layer 140 is formed on the sacrificial layer 130. The ribbon layer 140 may be selectively etched through a later process (refer to FIG. 7(f)) in order to be a particular shape (for example, having more than one holes).

Referring to FIG. 7(d), on the ribbon layer 140 is deposited a lower electrode 151, which is deposited by a piezoelectric layer 152 that is also deposited by an upper electrode 153, thereby forming a piezoelectric element 150. A center portion of the piezoelectric element 150 is etched, so that the piezoelectric element remains only on both ends of the ribbon layer 140.

Figure 7:
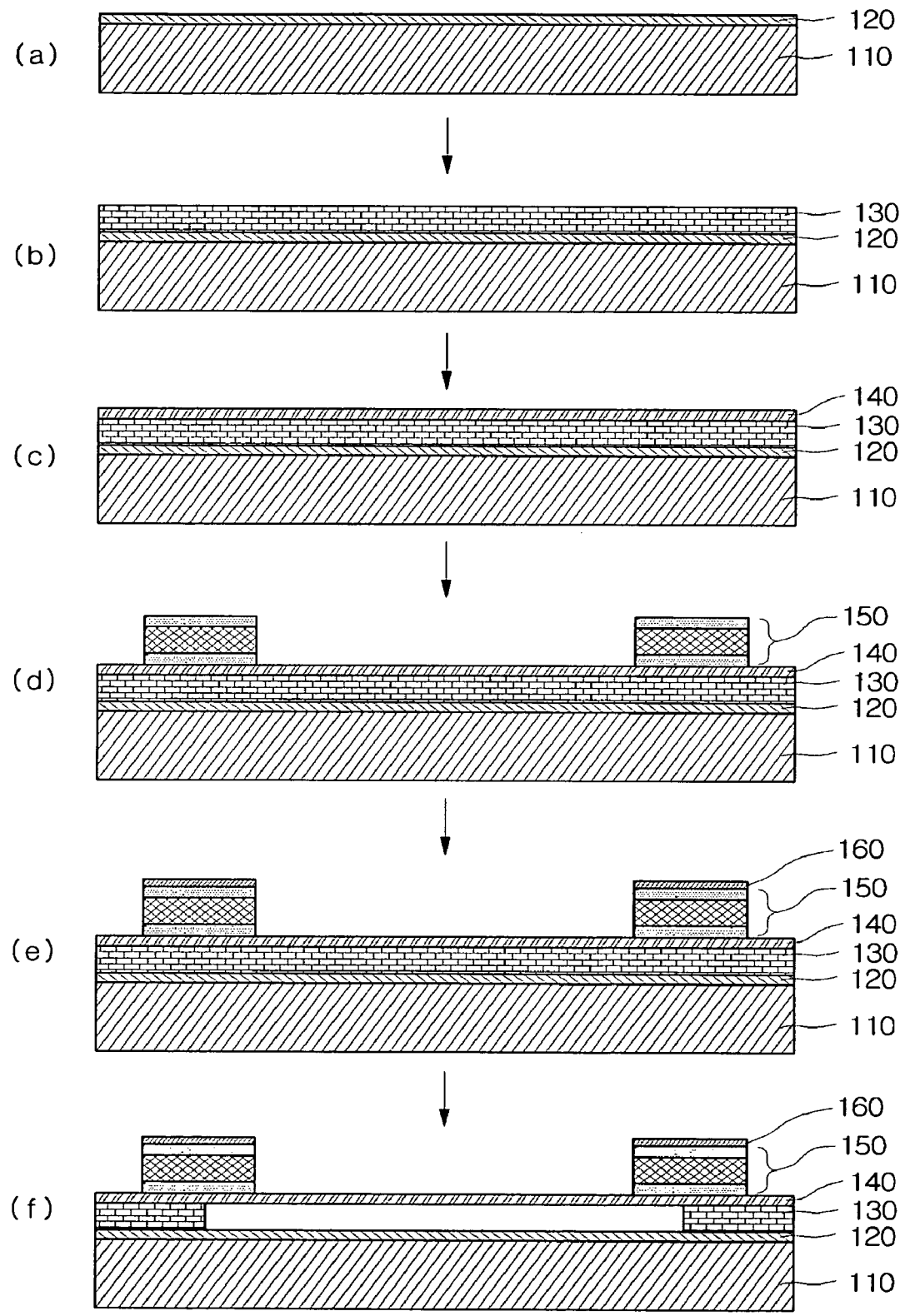
FIGS. 7(a) through 7(f) show a manufacturing process for the optical modulator having the passivation layer of FIG. 5.

However, unlike the optical modulator illustrated in FIG. 7, the piezoelectric element 150 may be formed on the entire surface of the ribbon layer 140. In this case, the aforementioned etching process is unnecessary.

Also, although not shown in FIG. 7, a $SiO_2$ layer may further be formed between the ribbon layer 140 and the lower electrode 151 in order to protect the ribbon layer 140 against the etching process of the lower electrode 151.

Referring to FIG. 7(e), on the piezoelectric element 150 is formed a passivation layer 160. The passivation layer 160 is composed of a single film or multiple films.

For example, when forming the passivation layer 160 with double films, a first passivation film 161 is deposited on the piezoelectric element 150, and then a second passivation film 162 is deposited on the first passivation film 161. Here, it is preferable that the deposition of the second passivation film 162 immediately follow the deposition of the first passivation film 161. However, the second passivation film 162 may be deposited after the later process of FIG. 7(c) is performed.

The passivation layer 160 may be deposited by a PDV (Physical Vapor Deposition) such as sputtering, e-beam evaporation, etc., a CVD (Chemical Vapor Deposition) such as MOCVD (Metal Organic CVD), PECVD (Plasma Enhanced CVD), etc., or ALD (Atomic Layer Deposition), etc.

Referring to FIG. 7(f), the sacrificial layer 130 is etched by an etchant (an etchant gas or an etchant solution) partially or entirely, so that the ribbon is spaced apart from the insulation layer 120 leaving a driving space for itself.

Here, the ribbon layer 140 can be selectively etched before the sacrificial layer 130 is etched. In this embodiment, the etching process for the ribbon layer 140 that allows a plurality of holes to form in the ribbon precedes the etching process for the sacrificial layer 130. In this case, the etchant is injected through these holes while the sacrificial layer 130 is etched.

While the invention has been described with reference to the disclosed embodiments, it is to be appreciated that those skilled in the art can change or modify the embodiments without departing from the scope and spirit of the invention or its equivalents as stated below in the claims.

What is claimed is:

1. An optical modulator comprising:
   a substrate;
   an insulation layer disposed on the substrate;
   a ribbon layer, an intermediate portion of which is spaced apart from the insulation layer by a predetermined gap;
   a piezoelectric element that is disposed on the ribbon layer and allows the intermediate portion of the ribbon layer to bend toward and away from the substrate; and
   a passivation layer that is disposed on the piezoelectric element and comprises a main passivation film; and a sacrificial layer that is disposed between the insulation layer and the ribbon layer and supports the ribbon layer, wherein a portion of the sacrificial layer below the intermediate portion of the ribbon layer is removed to provide a predetermined gap between the ribbon layer and the insulation layer.

2. The optical modulator of claim 1, wherein the piezoelectric element comprises:

a proximal electrode;

a piezoelectric layer disposed on the proximal electrode; and a distal electrode disposed on the piezoelectric layer, wherein the piezoelectric layer contracts and expands according to a predetermined voltage applied between the proximal electrode and the distal electrode to provide driving power to the intermediate portion of the ribbon layer.

3. The optical modulator of claim 1, wherein the main passivation layer is formed of dielectric material.

4. The optical modulator of claim 3, wherein the dielectric material is one selected from the group consisting of $Al_2O_3$, $TiO_2$, $Ta_2O_5$, $SiO_2$, SiN and SiBN.

5. The optical modulator of claim 4, wherein the thickness of the main passivation film ranges from $10^{-3}$ μm to 1 μm.

6. An optical modulator comprising:

a substrate;

an insulation layer disposed on the substrate;

a ribbon layer, an intermediate portion of which is spaced apart from the insulation layer by a predetermined gap;

a piezoelectric element that is disposed on the ribbon layer and allows an intermediate portion of the ribbon layer to bend toward and away from the substrate;

a passivation layer that is disposed on the piezoelectric element and comprises a main passivation film and a sub passivation film disposed on the main passivation film.

7. The optical modulator of claim 6, wherein the sub passivation film is formed of dielectric material.

8. The optical modulator of claim 7, wherein the dielectric material is one selected from the group consisting of $Al_2O_3$, $TiO_2$, $Ta_2O_5$, $SiO_2$, SiN and SiBN.

9. The optical modulator of claim 8, wherein the thickness of the sub passivation film ranges from $10^{-3}$ μm to 1 μm.

10. The optical modulator of claim 6, wherein the passivation layer further comprises another sub passivation film that is disposed between the piezoelectric element and the main passivation film.

11. The optical modulator of claim 10, wherein the another sub passivation film is formed of $Al_2O_3$.

* * * * *